March 17, 1970
NOBORU SHINKAI
3,501,378
METHOD FOR RECOVERING SILVER HALIDE
FROM PHOTOGPAPHIC SOLUTIONS
Filed June 22, 1967
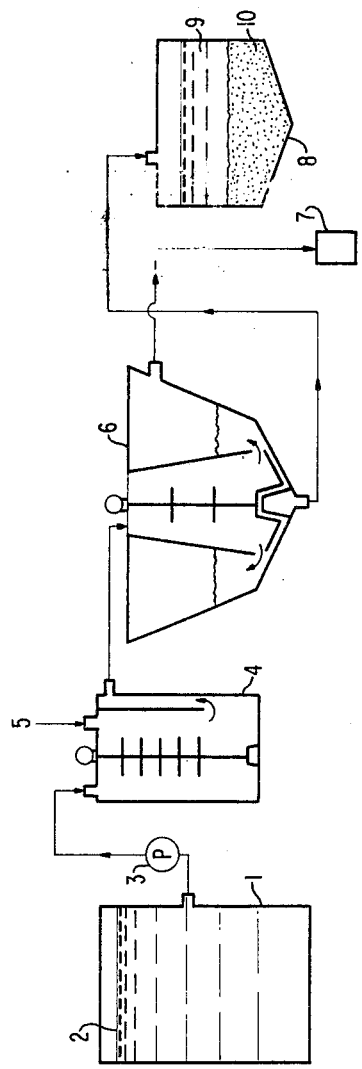
INVENTOR
NOBORU SHINKAI
BY
ATTORNEYS 3,501,378
METHOD FOR RECOVERING SILVER HALIDE FROM PHOTOGRAPHIC SOLUTIONS
Noboru Shinkai, Kanagawa, Japan, assignor to Fuji Shashin Film Kabushiki Kaisha, Kanagawa, Japan
Filed June 22, 1967, Ser. No. 648,081
Claims priority, application Japan, June 24, 1966, 41/41,118
Int. Cl. C12b 1/00
U.S. Cl. 195—2    3 Claims

ABSTRACT OF THE DISCLOSURE

In the recovery of silver halide from a wash water solution, coming from a washing step of a process for the production of photographic gelatino silver halide light-sensitive materials, by adding a coagulant followed by settling the improvement comprising reserving the waste solution in a reservoir open to the air, for from about 10 to 20 hours before the addition of the coagulant. The gelatin in the waste solution is decomposed by the fermentation with bacteria in the air. This facilitates settling of silver halide and gelatin with a reduced amount of coagulent.

BACKGROUND OF THE INVENTION

Field of the invention

This invention relates to a method for recovering silver halide from a wash water solution obtained during a step of making photographic materials.

In the photographic industry, valuable silver is used in such quantities that the necessity arises to recover silver from not only waste articles of light-sensitive material, but also from waste solutions from the development processing and the steps of making photographic light-sensitive materials. It is particularly important to recover the silver (silver halide) contained in waste water from the step of making light-sensitive materials, since the content is very small, about thirty p.p.m., and the waste water is produced in very large quantities.

Description of the prior art

A suitable method to recover completely a very small quantity of silver halide has not been established yet, because the content of silver halide in such waste solutions is very small, and a protective colloid, such as gelatin, is coexistent with the silver halide.

The commonly used methods consist in precipitating and separating silver halide by centrifugal separation, and in coagulating and precipitating by the use of a coagulant. In the former, the recovery percentage of silver is low, at most 70–80%, while in the latter, a coagulant, such as aluminum sulfate is used in large amounts and appears in the rocovered precipitate with gelatin. This results in a relative lowering of the content of silver and makes difficult the after-processing of the silver recovery, although the latter process is superior to the former in the percent of silver recovered.

The principal object of the invention is to provide a new silver recovery method wherein the foregoing disadvantages are overcome.

SUMMARY OF THE INVENTION

We have found that the objects of the invention can be favorably accomplished, in the silver recovery using a coagulant as mentioned above, by allowing the waste solution from a washing step of a process for the production of a light-sensitive material to stand in a reservoir having a sufficient capacity at a relatively constant temperature for a time sufficient to allow fermentation of the gelatin by contact with bacteria in the air, usually from about 10 to 20 hours, before charging it to a stirring tank. The waste solution is directly charged to a stirring tank and mixed with a coagulant in the prior art. Thus, the recovery percentage of silver is raised to 95% or more in spite of the fact that the amount of the coagulant is reduced to $\frac{1}{10}$ to $\frac{1}{20}$ times that of the prior art.

When the waste solution containing silver halide and gelatin, being exhausted from the washing step at a temperature of 10–40° C., is reserved in a reservoir at that temperature for a suitable number of hours, a fermenting action takes place by contact with bacteria in the air, and the gelatin is thus decomposed. Consequently, the settling treatment can be readily carried out with a small amount of coagulant. The decrease in the amount of coagulant used relatively increases the content of silver in the recovered precipitate, whereby the subsequent processings are readily accomplished. If desired, air may be introduced forcibly into the waste solution in the reservoir.

BRIEF DESCRIPTION OF THE DRAWING

The invention is illustrated specifically in the accompanying drawing which is a somewhat schematic, side-sectional view of apparatus for carrying out the process of the invention.

DETAIL DESCRIPTION OF THE INVENTION

Referring to the drawing, there is shown a reservoir 1 for reserving a waste solution 2 from a washing step. After the fermenting decomposition of the waste solution proceeds sufficiently in this reservoir for a perior of from about 10 to 20 hours, the waste solution is fed to a stirring tank 4 by means of a pump 3. In stirring tank 3 the solution is mixed with a coagulant, such as aluminum sulfate from inlet 5, and then fed to a forcibly coagulating tank 6, where it is separated into a precipitate and a supernatant liquid. The latter is discharged via waste channel 7 and the former is removed in settling tank 8 where it is separated into two fractions, aqueous phase 9 and precipitate phase 10 of gelatin and silver halide, which is then fed to a known recovery step to recovery the silver halide.

In general, the content of silver halide in waste solution from a washing step is on the order of less than about 100 parts per million and the content of gelatin is an much as or at most several times the amount of silver halide. As the coagulant there is used aluminum sulfate, ferric sulfate, ferric chloride or zinc sulfate. In the case of no reserving step, as the prior art, from about 500 to 1000 p.p.m. of a coagulant, for example, aluminum sulfate, is required to effectively settle the silver halide but, in this invention, the settling or precipitation can be achieved with about $\frac{1}{10}$ the amount of coagulant, for example, 50 p.p.m. However, the exact amount of coagulant used depends on the concentration of the washing waste water, of course.

In the method of our invention, as is evident from the above description, the amount of coagulant to be used can be reduced and the separation of silver halide from the precipitate is made easy due to the fact that the amount of coagulant contained in the precipitate is correspondingly reduced.

The following example is given to illustrate the invention:

EXAMPLE

A waste solution containing 80 p.p.m. of silver bromide and 100–120 p.p.m. of gelatin, exhausted from a step in a process of making a photographic film, was fed to a stirring tank 4 directly, not through a reservoir 1, and mixed with aluminum sulfate to recover the silver. 500 p.p.m. of the coagulant was required. However, when coagulation of the same starting solution with aluminum sulfate was carried out after the waste water was allowed to stand in a reservoir for 20 hours in accordance with the invention, the amount of the coagulant was reduced to 50 p.p.m. The precipitate containing silver halide and and gelatin, collected in a settling tank 8, was so enriched with the silver, due to such a small amount of coagulant, that the refining of silver could be favorably effected.

What is claimed is:

1. In a method of recovering silver halide from a waste solution, containing silver halide and gelatin, produced in a washing step of a process for producing or processing silver halide light-sensitive materials, by adding a coagulant to the solution and precipitating the silver halide together with the gelatin, the improvement which comprises allowing said waste solution to stand in a reservoir until the gelatin contained therein is decomposed by fermentation with bacteria in the air prior to the addition of the coagulant.

2. The method of recovering silver halide as claimed in claim 1 wherein said waste solution is allowed to stand in the reservoir at a temperature of from 10° C. to 40° C.

3. The method of recovering silver halide as claimed in claim 1 wherein said waste solution is allowed to stand in contact with air for from about 10 to 20 hours.

References Cited

UNITED STATES PATENTS 1,065,115   6/1913   Danzer _____ 195—3

LIONEL M. SHAPIRO, Primary Examiner

U.S. Cl. X.R.

96—94; 23—305